May 23, 1961 K. GEBELE 2,985,085
INTERCHANGEABLE OBJECTIVE FOR PHOTOGRAPHIC CAMERAS
Filed March 16, 1959 2 Sheets-Sheet 1

May 23, 1961 K. GEBELE 2,985,085
INTERCHANGEABLE OBJECTIVE FOR PHOTOGRAPHIC CAMERAS
Filed March 16, 1959 2 Sheets-Sheet 2

United States Patent Office 2,985,085
Patented May 23, 1961

2,985,085
INTERCHANGEABLE OBJECTIVE FOR PHOTOGRAPHIC CAMERAS
Kurt Gebele, Munich, Germany, assignor to Compur-Werk Friedrich Deckel O.H.G., Munich, Germany, a firm of Germany
Filed Mar. 16, 1959, Ser. No. 799,703
Claims priority, application Germany Mar. 21, 1958
6 Claims. (Cl. 95—64)

The present invention relates to interchangeable objectives for a photographic camera, particularly of the type known as a single lens reflex miniature camera, wherein the objective has an aperture preselector device controllable from the camera body.

Interchangeable objectives incorporating an aperture preselector device as heretofore designed as usually recognizable by their appearance, since the coordinating transmission mechanism is ordinarily contained either in an asymmetrical projecting portion of the objective mount or the external diameter of the mount is enlarged to provide space for the accommodation of this mechanism. This increase in size as well as the greater weight of the objective are undesirable features.

Accordingly, an object of this invention is to provide a generally improved and more satisfactory interchangeable objective for a single lens reflex focusing camera having a pleasing appearance while yet admirably performing its intended functions.

Another object is the provision of an interchangeable objective with an aperture preselector device which is controllable from the camera body, and which at the same time occupies so little space that the necessity of constructing the objective with inconvenient projecting structural parts or of enlarging the diameter of the objective assembly does not arise.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
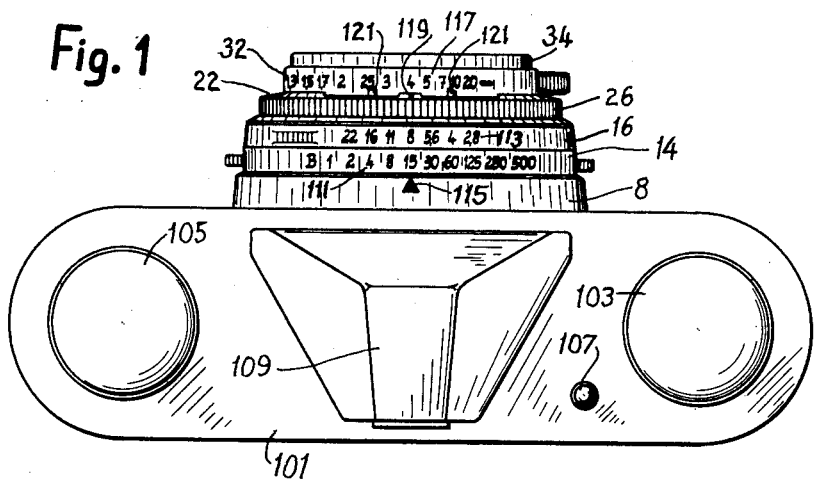
Fig. 1 is a top view of a photographic camera including an objective according to the present invention having an interchangeable focusing lens and diaphragm unit.

In Fig. 1 is shown a photographic camera of the kind commonly known as a miniature camera of the single lens reflex type. In this type of camera, a single lens is used successively for both the focusing and view finding operation and the picture taking operation. Ordinarily a diaphragm aperture is preselected and set on the camera, and the shutter speed is selected and set, although, of course, an exposure value may be set, if the shutter is of this type, with or without regard to the absolute settings of the shutter speed and diaphragm aperture. The shutter blades are then opened and the diaphragm leaves moved from their preselected aperture position to the maximum aperture position so that the focusing and view finding operations may be performed. Then the shutter blades are closed and the diaphragm leaves are moved back to the preselected aperture position before opening and closing the shutter blades again for the picture taking operation.

The camera includes a camera body 101 on the top of which is mounted a film winding knob 103, a rewind knob 105, and a shutter release 107. These parts may be of any suitable form, since the invention is not concerned with this part of the camera, but rather with the objective. The camera also desirably includes a view finder 109.

The lens and shutter portion of the camera includes a portion carried permanently by the camera body 101, and an interchangeable focusing lens and diaphragm unit. The external appearance of the objective is evident in Fig. 1 and will be described briefly before proceeding to a more detailed analysis of the internal construction. A bayonet ring 8 stationarily attached to the front wall of the camera body carries rotatably a shutter speed setting ring 14 and a diaphragm aperture setting ring 16. The ring 14 bears a circumferentially graduated shutter speed scale 111 of conventional form, and the ring 16 bears a diaphragm aperture scale 113 of conventional form, both of the scales being readable in connection with an index mark 115 carried by the ring 8. The interchangeable focusing lens and diaphragm unit or objective unit includes an exchangeable or interchangeable mount 22 having a knurled ring 26 to be grasped and rotated when removing and inserting the unit, and a rotatable focusing ring 32 bearing a conventional focusing distance scale 117 readable in connection with a mark 119 carried by the mount 22. A lens tube 34 is axially displaceable by rotation of the focusing ring 32 in a manner to be further explained. Desirably a depth of field indicating device is provided including a pair of pointers 121 which cooperates with the focusing scale 117 moving symmetrically on either side of the mark 119. The depth of field indicating device is driven in conventional manner in response to rotation of the diaphragm aperture setting ring 16 by a suitable coupling, such as in the manner shown in the copending U.S. patent application of Franz Singer (a co-worker of the present applicant), Serial No. 555,964, filed December 28, 1955, now Patent Number 2,926,588 issued March 1, 1960, or in the present applicant's copending application, Serial No. 562,346, filed January 30, 1956, now Patent Number 2,949,835 issued August 23, 1960. But neither the presence of the depth of field indicating mechanism, nor the details of construction of such mechanism if it is present, are important so far as the present application is concerned.

Figure 2:
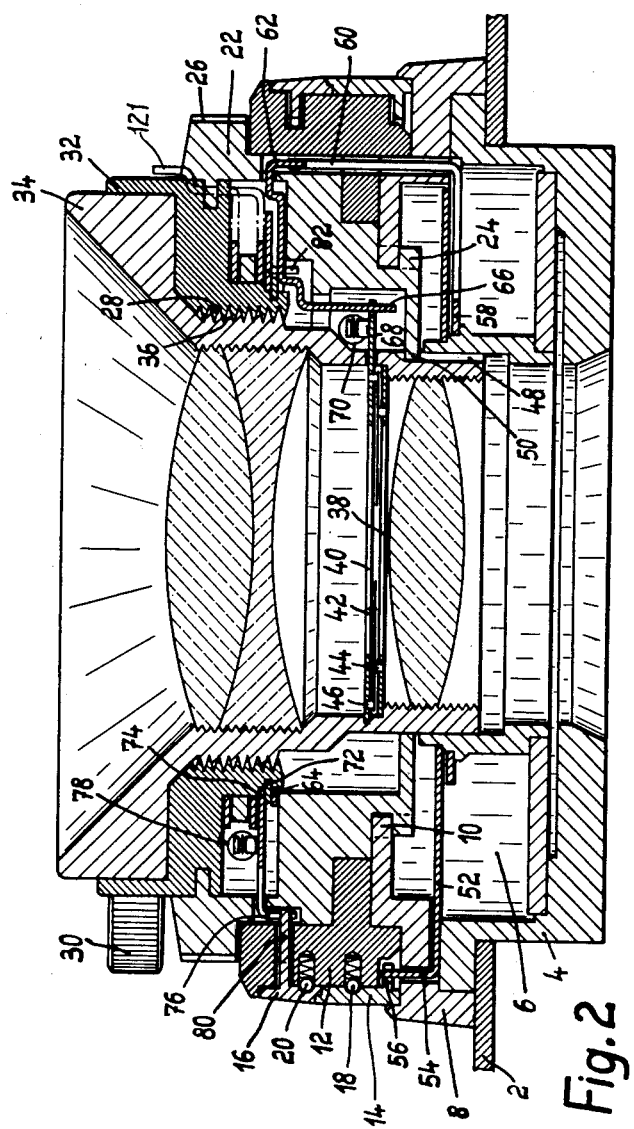
Fig. 2 is an axial cross-section of the objective according to a first embodiment of the invention shown mounted on a fragmentary portion of the camera body.

The structure of the objective is shown in greater detail in Fig. 2. Secured to the front plate or wall 2 of the camera body 101 is a flange of a cylindrical shutter housing 4 having a central annular space 6 in which is mounted a shutter mechanism (not shown) of suitable conventional construction. The shutter is preferably of the type disclosed in British Patent 769,086, to Deckel, published February 27, 1957. The previously mentioned bayonet ring 8 is likewise attached to the front plate or wall 2 of the camera body surrounding the shutter housing 4, and has bayonet projections 10 for cooperation with corresponding projections 24 on the interchangeable unit to form a bayonet joint or connection. An adapter ring 12 is secured as by bolting to the bayonet ring 8 on the face of the camera body. This adapter ring together with the bayonet ring 8 forms an axial and radial bearing for supporting rotatably the shutter speed setting ring 14 and the aperture setting ring 16. The rings 14 and 16 preferably carry manipulating grips and are desirably held in a predetermined angular position by any suitable detent or latching means such as the spring loaded balls 18 and and 20, respectively, which are mounted on a stationary portion and cooperate with notches in the respective rings. In case the camera is to be adjusted in terms of exposure value, the detent means for the aperture ring 16 may be dispensed with and is instead suitably coupled with the speed setting ring 14 in conventional manner.

The exchangeable mount ring 22, constituting the main body of the interchangeable objective, is removably fitted within the adapter ring 12 and is detachably engaged with the bayonet ring 8 on the camera front by the intermating of bayonet projections 24 with the projections 10. The outer edge of the mount 22 forwardly of the adapter ring 12 is preferably knurled to provide the knurled grip 26 for convenience of handling when removing and inserting the exchangeable focusing lens and diaphragm unit. The focusing ring 32 is rotatably though axially non-displaceably mounted inside the mount ring 22, and has an internal thread 28 and a milled manipulating grip 30 to facilitate its rotation. The lens tube 34 extends rearwardly within the rings 32 and 22 and has an external thread 36 in engagement with the threads 28 of the focusing ring 32, so that rotation of the focusing ring translates the lens tube 34 axially. The lens tube 34 houses the objective lenses, an axially spaced doublet and singlet being here shown simply as a typical example, and also provides a mount for objective diaphragm leaves 42. The diaphragm leaves 42 are mounted between a fixed diaphragm ring 38 and a movable diaphragm operating ring 40 and are connected thereto by pivot pins 44 and sliding pins 46 in a conventional manner. As is well understood by those familiar with the art, rotation of the diaphragm operating ring 40 moves the diaphragm leaves 42 to provide various diaphragm apertures. An axial groove 48 milled into the rear end of the lens tube 34 is engaged by a projection 50 on the mount ring 22 to prevent the lens tube from rotating as it is axially displaced by rotation of the focusing ring 32.

Rotatably mounted inside the shutter housing 4 is an internal shutter speed adjusting ring 52 for controlling the shutter speed in the conventional manner. The internal adjusting ring 52 is suitably coupled with the external shutter speed setting ring 14, and for this purpose a forwardly projecting arm 54 of the ring 52 extends through a slot in the bayonet ring 8 and engages a fork 56 of the setting ring 14. Thus, rotating the shutter speed setting ring 14 to a selected shutter speed setting adjusts the angular position of the ring 52 for the particular speed selected. Also rotatably mounted within the shutter speed housing 4 is a control ring 58 which may correspond to the control ring 76 described in the aforementioned British patent. The control ring 58 is provided with a radially and forwardly extending arm 60, the forwardly extending portion of the arm 60 being angularly movable within a slot in the bayonet ring 8, the adapter ring 12, and a cavity between the exchangeable mount 22 and the adapter ring.

To enable the shutter control member 58, 60 to open the diaphragm leaves to maximum aperture for focusing, there is a diaphragm actuating ring 64 surrounding and rotatably mounted on the focusing ring 32 near its rear end. A rearwardly extending arm 62 at the outer edge of the ring 64 lies in the path of travel of the forwardly extending arm 60 of the shutter control ring 58. At its inner edge, the actuating ring 64 has a cranked rearwardly extending arm 66 which engages a forked end or other suitable abutment surface of a radially extending arm 68 of the diaphragm operating ring 40. The arm 68 extends through a slot in the lens tube 34. The diaphragm operating ring 40 is urged in the direction of the smallest diaphragm aperture by means of a helical spring 70 fixed to the arm 68 and to a fixed point on the mount 22. The spring 70 cannot turn the ring 40, 68 any further than the limiting position determined by the position of the actuating ring 64.

To provide an operative connection between the external manually operable diaphragm aperture setting ring 16 and the diaphragm operating ring 40 for the setting of a selected diaphragm aperture, a diaphragm aperture control ring 74 is rotatably mounted about the focusing ring 32 and is spaced forwardly from the ring 64 by an intermediate spacing ring 72. The ring 74 has a rearwardly extending arm 76 providing a coupling and which is in contact with a radial projection 80 on the setting ring 16. A helical spring 78 is attached to the ring 74 and to a fixed point on the mount body 22 to establish this contact between the arm 76 and the projection 80. To enable the control ring 74 to control the position of the actuating ring 64, there is a rearwardly extending projection 82 on the control ring 74 which lies in the path of the ring 64 to limit the extent to which the ring 64 can turn in an aperture-closing direction.

By this arrangement it can be seen that adjusting the diaphragm aperture setting ring 16 in an aperture-increasing direction to a selected setting rotates the control ring 74 so that the arm 82 thereof moves the actuating ring 64 to a corresponding angular position, and the contact of the arm 66 on the ring 64 with the arm 68 on the diaphragm operating ring 40 adjusts the position of the diaphragm leaves 42 to open them to the proper aperture selected by the manual setting ring 16. If the ring 16 is turned in the opposite or aperture-reducing direction, the force of the spring 70 causes the other parts to follow along to the new position determined by the setting of the ring 16.

The forwardly extending arm 60 of the shutter control ring 58 has a coupling or driving engagement with the arm 62 of the diaphragm actuating ring 64 (as already mentioned) so that rotation of the control ring 58 to open the shutter blades for the focusing and view finding operations serves likewise to move the diaphragm leaves 42 from their preselected setting to a maximum aperture position for focusing. It is to be noted that the coupling ends provided by the arms 62 and 76 are at substantially the same radial distance from the optical axis and are located in substantially the same plane normal to the optical axis. In order that their adjusting motions not interfere, the arms 62 and 76 are angularly displaced through an angle at least as large as the angular adjustability range of the arm 60 of the control ring 58.

Reviewing the operation, the shutter speed setting ring 14 and the diaphragm aperture setting ring 16 are moved to a selected position and held in place by the detent means provided by the spring loaded balls 18 and 20, respectively. The diaphragm leaves 42 accordingly are set to the corresponding aperture by means of the projection 80 on the ring 16 abutting the arm 76 of the control ring 74, so that, in turn, the projection 82 on the ring 74 determines the position of the actuating ring 64, whose arm 66 then determines the position of the diaphragm operating ring 40. Adjustment of the shutter speed setting ring 14 produces a corresponding adjustment of the ring 52 to set the proper shutter speed on the shutter by mechanism not here shown but well known in the art and disclosed in part in the aforementioned British patent. As is evident from the disclosure of this patent, tensioning of the shutter serves to open the shutter blades and to rotate the control ring 58 so that the diaphragm leaves 42 are moved from their preselected position to the position of maximum aperture. Thus, the arm 60 rotates with the control ring 58 and abuts the arm 62 on the actuating ring 64 to move the ring 64 away from abutment with the projection 82 while at the same time moving the angular position of the arm 66 to rotate the control ring 40 to a position corresponding to a maximum aperture. During this opening for focusing, the rings 16 and 74 remain stationary. Upon release of the shutter, the arm 60 and control ring 58 rotate in the opposite direction to return the ring 64 under action of the spring 70 to the position where it abuts the projection 82 to hold the diaphragm leaves 42 in the preselected aperture position. The shutter blades also close, as explained in the British patent. As the shutter runs down, the ring 58 continues its rotation, as a result of which the arm 60 moves away from the arm 62, and thereafter in the further running down of the ring 58, the shutter blades are opened and closed again for the picture taking operation.

To replace the interchangeable lens and diaphragm unit, it is only necessary to grasp the knurled grip 26 and rotate to disengage the bayonet projections 10 and 24. The arms 62 and 76 disengage freely as the unit is thereafter moved axially forward. The insertion of the unit requires movements in the reverse order, of course, and it is only necessary to see that the arms 62 and 76 are oriented with the arm 60 and projection 80.

Figure 3:
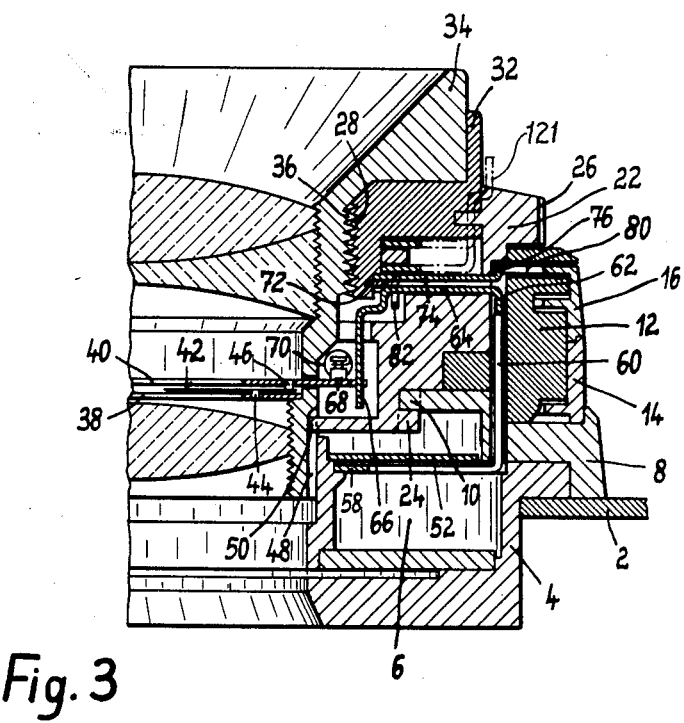
Fig. 3 is a fragmentary axial cross-section similar to Fig. 2 showing another embodiment of the invention.

In the embodiment of Fig. 3, the structure is substantially the same and identical parts have been given the same numerals as in Fig. 2. In this modification, the radial arm 76 of the diaphragm control ring 74 is bent forwardly rather than rearwardly, to abut the projection 80 on the diaphragm aperture setting ring 16. The respective rearwardly and forwardly bent engaging arms 62 and 76 of the respective rings 64 and 74 are here located at the same radial distance from the optical axis, but are in different transverse planes spaced axially from each other, so it is not necessary to space them circumferentially in different radial planes, and they will not interfere with each other even if they are in the same radially extending axial plane. The operation of this modification is substantially the same as in that of Fig. 2, so that no further explanation is thought to be necessary.

The advantage of both the embodiments is that an aperture preselector device has been provided in an interchangeable focusing lens and diaphragm unit which is controllable from the camera body, and which at the same time occupies so little space that the necessity of constructing the objective with inconvenient projecting structural parts thereby enlarging the diameter of the objective assembly does not arise. The structural complexity and weight of the objective is minimized while still having the same desirable functions.

Certain subject-matter disclosed but not claimed herein is claimed in applicant's copending application, Serial No. 783,911, filed December 30, 1958.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An interchangeable focusing lens and diaphragm unit for detachable mounting on a camera body of the single lens reflex focusing type, said interchangeable unit comprising a mount ring having means for securement to the camera body, a focus ring rotatably mounted on said mount ring, a lens tube extending within said mount ring and operatively connected to said focus ring for axial adjustment in response to rotation of said focus ring, said lens tube having an optical axis, an adjustable iris diaphragm mounted in said lens tube and an operating ring therefor for adjusting said diaphragm between minimum and maximum aperture positions, spring means tending to move said operating ring toward the minimum aperture position, a pair of diaphragm adjusting rings rotatably mounted on said focus ring, means defining a releasable coupling between said pair of rings, one of said pair of rings having a rearwardly extending arm connected to said operating ring, a radially extending arm on each of said pair of rings each having a coupling end at the same radial distance from the optical axis, the radial arm on the one of said pair of rings being adapted to be releasably engaged by a shutter control ring arm on the camera body for moving the diaphragm from a preselected aperture position to the maximum aperture position, and the radial arm on the other of said pair of rings being adapted to be coupled with a diaphragm aperture setting ring on the camera body.

2. A construction as defined in claim 1 including spring means for biasing the other of said pair of adjusting rings.

3. A construction as defined in claim 1 wherein said coupling ends of said radial arms are located in the same plane normal to the optical axis and are relatively angularly displaced through an angle at least as large as the adjustability range of the shutter control ring arm on the camera body for moving the diaphragm from a preselected aperture position to a maximum aperture position.

4. A construction as defined in claim 1 wherein said coupling ends of said radial arms are located in different planes normal to the optical axis.

5. An interchangeable focusing lens and diaphragm unit for detachable mounting on a camera body of the single lens reflex focusing type, said interchangeable unit comprising a mount ring having means for securement to the camera body, a focus ring rotatably mounted on said mount ring, a lens tube extending within said mount ring and operatively connected to said focus ring for axial adjustment in response to rotation of said focus ring, said lens tube having an optical axis, an adjustable iris diaphragm mounted in said lens tube and an operating ring therefor for adjusting said diaphragm between minimum and maximum aperture positions, spring means tending to move said operating ring toward the minimum aperture position, a first and a second diaphragm aperture adjusting ring rotatably mounted on said focus ring, a projection on said first ring abutting said second ring for releasably coupling said adjusting rings, a first radial arm on said first ring adapted to be coupled at its end to a diaphragm aperture setting ring, spring means tending to urge said first radial arm into coupling engagement, a rearwardly extending arm on said second adjusting ring coupled to said diaphragm operating ring, and a second radial arm on said second ring adapted to be coupled at its end to a shutter control ring arm on the camera body for moving the diaphragm from a preselected position to the maximum aperture position, the coupling ends of said first and second adjusting rings being at the same radial distance from the optical axis.

6. The combination with a camera body, of an interchangeable objective unit mounted on said body, said unit including an adjustable diaphragm and an optical axis passing centrally through said diaphragm, a diaphragm operating ring mounted on said unit for rotation about said axis, a diaphragm aperture preselecting ring mounted on said body for rotation about said axis, a shutter control ring also mounted on said body for rotation about said axis, and intermediate ring means mounted on said unit for rotation about said axis and serving to adjust the position of said diaphragm operating ring from the positions of said aperture preselecting ring and said shutter control ring, said intermediate ring means including two engaging parts at the same radial distance from said optical axis, one of said engaging parts engaging said aperture preselecting ring and the other of said engaging parts engaging said shutter control ring.

References Cited in the file of this patent

UNITED STATES PATENTS

| 2,380,610 | Pignone | July 31, 1945 |
| 2,716,930 | Marson | Sept. 6, 1955 |

FOREIGN PATENTS

| 409,777 | Great Britain | May 10, 1934 |
| 769,086 | Great Britain | Feb. 27, 1957 |